US010623097B2

(12) United States Patent
Bermak

(10) Patent No.: US 10,623,097 B2
(45) Date of Patent: Apr. 14, 2020

(54) VISIBLE LIGHT COMMUNICATION SYSTEM AND METHOD

(71) Applicant: Qatar Foundation for Education, Science and Community Development, Doha (QA)

(72) Inventor: Amine Bermak, Doha (QA)

(73) Assignee: Qatar Foundation for Education, Science and Community Development, Doha (QA)

( * ) Notice: Subject to any disclaimer, the term of this patent is extended or adjusted under 35 U.S.C. 154(b) by 0 days.

(21) Appl. No.: 16/105,838

(22) Filed: Aug. 20, 2018

(65) Prior Publication Data

US 2019/0074901 A1 Mar. 7, 2019

(30) Foreign Application Priority Data

Jun. 20, 2017 (GB) .................................. 1709819.5

(51) Int. Cl.
*H04B 10/116* (2013.01)
*H04B 10/532* (2013.01)

(52) U.S. Cl.
CPC ......... *H04B 10/116* (2013.01); *H04B 10/532* (2013.01)

(58) Field of Classification Search
CPC ............................ H04B 10/116; H04B 10/532
See application file for complete search history.

(56) References Cited

U.S. PATENT DOCUMENTS

| | | | |
|---|---|---|---|
| 6,310,707 B1 | 10/2001 | Kawase et al. | |
| 2012/0301155 A1* | 11/2012 | Irie | H04B 10/1143 398/182 |
| 2015/0188630 A1* | 7/2015 | Yeh | H04B 10/116 398/130 |
| 2018/0145762 A1* | 5/2018 | Dutton | H04B 10/114 |

FOREIGN PATENT DOCUMENTS

| | | |
|---|---|---|
| CN | 204795041 | 11/2015 |
| EP | 0 851 613 A2 | 7/1998 |
| JP | 07-273726 | 10/1995 |
| JP | 10-190572 | 7/1998 |
| KR | 10-2017-0019720 | 2/2017 |

* cited by examiner

*Primary Examiner* — Leslie C Pascal
(74) *Attorney, Agent, or Firm* — Martin & Ferraro, LLP

(57) ABSTRACT

A transmitting apparatus and a receiving apparatus for visible light communication and a visible light communication system resistant to optical interference is provided. The visible light communication system includes a transmitting apparatus and a receiving apparatus. The transmitting apparatus includes a complimentary data generator and two transmitting modules. The transmitting modules include plurality of visible light sources and a transmitting polarization lens. Polarization of the two transmitting polarization lenses are orthogonal to each other. The receiving apparatus includes two receiving modules and a differential amplification module. The receiving modules include a photodiode and a receiving polarization lens. Polarization of the receiving polarization lens pair and transmitting polarization lens pair are the same.

7 Claims, 20 Drawing Sheets

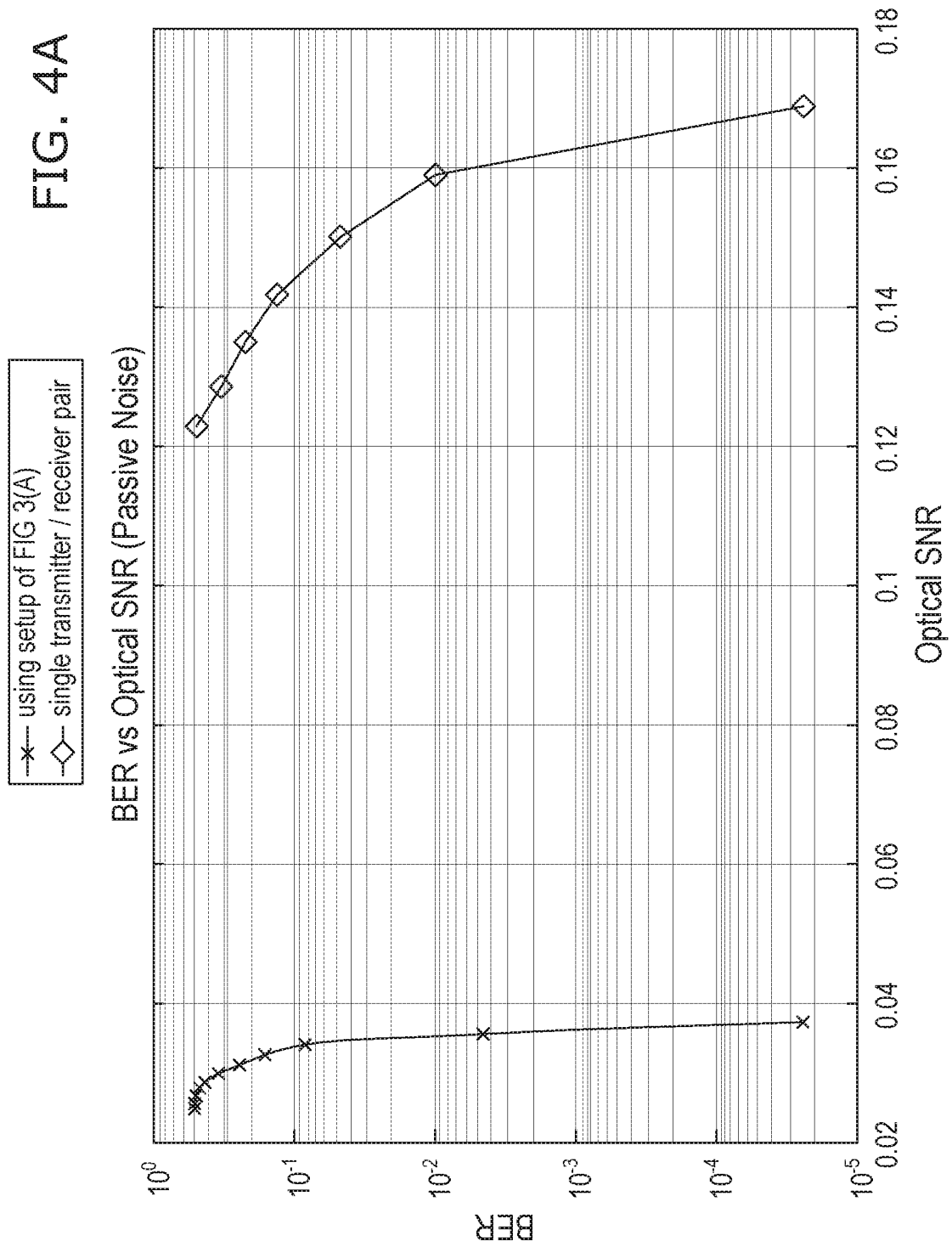

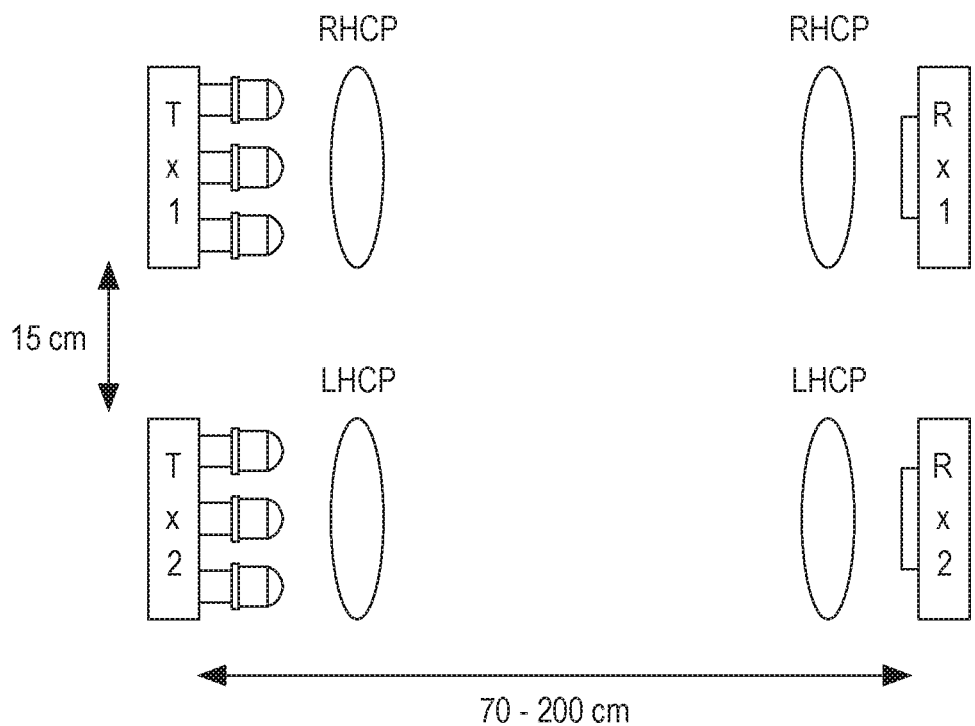
FIG. 9A
FIG. 9B
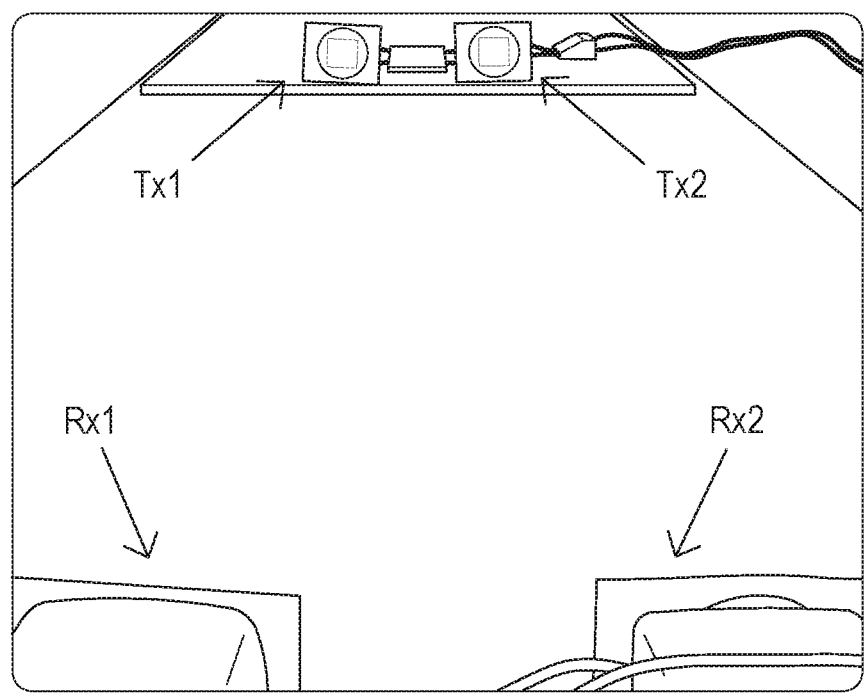

VISIBLE LIGHT COMMUNICATION SYSTEM AND METHOD

CROSS-REFERENCE TO RELATED APPLICATIONS

This application claims priority to Great Britain Application No. GB1709819.5, filed Jun. 20, 2017, entitled "Visible Light Communication System and Method," the entire contents of which are incorporated herein by reference.

TECHNICAL FIELD

The disclosure relates to a visible light communication system and more particularly to a transmitting apparatus and receiving apparatus to decrease bit error rate (BER) under optical noise interference.

BACKGROUND

Visible light communication (VLC) is a type of wireless communication that uses visible light to transmit data over a communication channel. This method utilizes the property of light emitting diodes (LED) or laser diodes (LD) to turn on and off at medium to high frequencies. The visible light communication can be applied to form indoor communication networks like indoor navigation or outdoor communication networks like inter vehicle communication. Since visible light can be utilized for both illumination and communication, this subject has become an active research area among many companies and research institutes.

RELATED TECHNOLOGY

[1] K. Cui, G. Chen, Z. Xu, and R. D. Roberts, "Line-of-sight visible light communication system design and demonstration," Commun. Syst. Networks Digit. Signal Process. (CSNDSP), 2010 7th Int. Symp., pp. 621-625, 2010.
[2] S. Videv and H. Haas, "Practical Space Shift Keying VLC System," vol. 1, pp. 405-409.
[3] Y. Zhao and J. Vongkulbhisal, "Design of visible light communication receiver for on-off keying modulation by adaptive minimum voltage cancelation," Eng. J., vol. 17, no. 4, pp. 125-129, 2013.
[4] Z. Yang, "Wearables Can Afford: Light-weight Indoor Positioning with Visible Light Categories and Subject Descriptors," pp. 317-330.
[5] A. Cailean, B. Cagneau, L. Chassagne, S. Topsu, Y. Alayli, and M. Dimian, "A Robust System for Visible Light Communication," no. Vic.
[6] I. E. L. M. L. S. F. W. L., "Performance enhancement of outdoor visible-light communication system using selective combining receiver," in Optoelectronics IET, 2008, vol. 2, no. 1, pp. 1-5.
[7] N. Lourenco, D. Terra, N. Kumar, L. N. Alves, and R. L. Aguiar, "Visible light communication system for outdoor applications," Proc. 2012 8th Int. Symp. Commun. Syst. Networks Digit. Signal Process. CSNDSP 2012, 2012.
[8] N. Kumar, D. Terra, N, Lourenao, L. N. Alves, and R. L. Aguiar, "Visible Light Communication for Intelligent Transportation in Road Safety Applications," pp. 1513-1518, 2011.
[9] D. Kim, S. Yang, H. Kim, Y. Son, and S. Han, "Outdoor Visible Light Communication For Inter-Vehicle Communication Using Controller Area Network," pp. 31-34, 2012.
[10] Y. H. Chung, "Efficient Optical Filtering for Outdoor Visible Light Communications in the Presence of Sunlight or Artificial Light," pp. 749-752, 2013.
[11] J. Yoo, R. Lee, J. Oh, H. Sea, J. Kim, and H. Kim, "Demonstration of Vehicular Visible Light Communication Based on LED Headlamp," pp. 465-467, 2013.
[12] Y. H. Kim and V. Communications, "Experimental Demonstration of VLC-Based Vehicle-to-Vehicle Communications Under Fog Conditions Experimental Demonstration of VLC-Based," vol. 7, no. 6, 2015.
[13] P. Y. Huang, "Mitigation of Optical Background Noise in Light Emitting Diode (LED) Optical Wireless Communication Systems Mitigation of Optical Background Noise in Communication Systems," vol. 5, no. 1, pp, 0-7, 2013.
[14] P. Y. Huang, "Background Optical Noises Circumvention in LED Optical Wireless Systems Using OFDM," vol. 5, no. 2, 2013.
[15] I. Standard and I. C. Society, IEEE Standard for Local and metropolitan area networks—Part 15.7: Short-Range Wireless Optical Communication Using Visible Light IEEE Computer Society no. September 2011.

LEDS are replacing traditional lighting in vast applications including indoor lights, street lights, traffic lights, information/warning lights and vehicle front/back lights. This fact together with the property of LEDs to turn on and off at medium to high frequencies, has enabled Visible Light Communication (VLC) to make its position as an active research area not only for indoor communication systems but also for outdoor applications. Much work has been done to utilize VLC for indoor applications [1]-[3]. An active research area in this domain is VLC based indoor positioning system [4]. Despite the challenges faced by VLC in outdoor environment, researchers are keen to find a reliable solution for utilizing VLC in outdoor applications [5]-[7]. A promising area is the utilization of VLC for establishing Vehicle-to-Vehicle (V2V) and Vehicle-to-Infrastructure (V2I) communication links to realize driver assistance applications in Intelligent Transportation Systems (ITS). VIDAS (a Portuguese government funded research project) demonstrated the feasibility for VLC based communication link between LED based traffic lights and vehicles up to 50 m of range [8].

The main challenges involved in establishing a robust outdoor VLC link is combating optical noise and receiver saturation particularly for Photo Diode (PD) based receivers. Significant work has been done in utilizing optical filters and lenses to reduce optical noise in V2V VLC links [9]-[11]. Y. H. Kim [12] showed that use of Fresnel lens at receiver increases the Signal-to-Noise (SNR) ratio under foggy weather conditions. However evaluation of VLC link performance under bright noise sources is a challenging area that requires additional investigation. Previously, it was shown that by utilizing Manchester encoding [13] or Orthogonal Frequency Division Multiplexing (OFDM) [14], the effect of optical noises produced by conventional fluorescent lights and AC powered LEDs can be mitigated. However, the data rate considered was much higher than the optical noise frequency and performance degradation was observed with spectral overlap between noise and data.

BRIEF DESCRIPTION OF THE DRAWINGS

In order that the invention can be more readily understood, embodiments thereof are now described, by way of example and illustration only without limiting the present disclosure, with reference to the following drawings, in which:

FIG. 4A and FIG. 4B are BER of an embodiment;

FIG. 9A is a schematic representation of an example configuration;

FIG. 9B is a schematic representation of an example setup;

DETAILED DESCRIPTION

Figure 1:
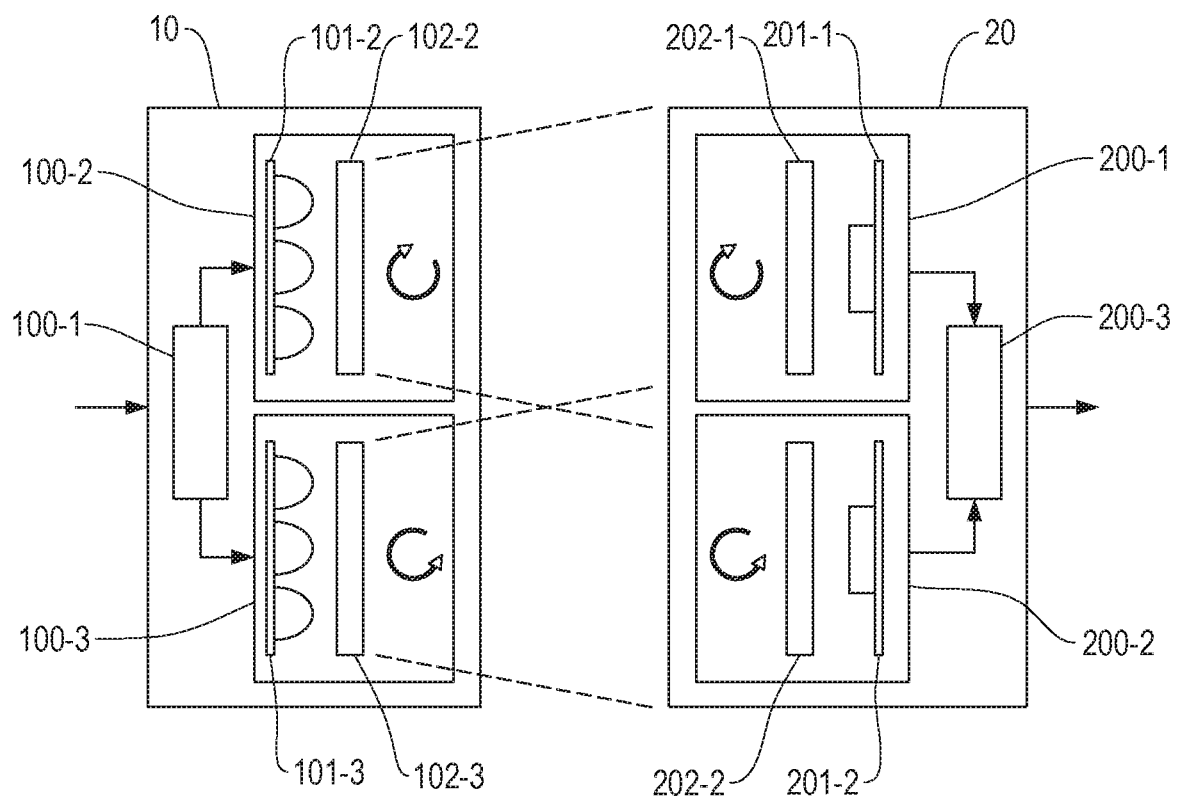
FIG. 1 is a block diagram of a visible light communication system in an embodiment.

The innovation utilises a technique that deconstructs a signal into two different optical signals which are then orthogonally polarised to one another.

The innovation transmits different optical signals which are orthogonally polarised to one another and this has a technical advantage in that the resultant system is more noise tolerant and robust (i.e. less susceptible to signal deterioration in bright light (noisy) conditions.

The innovation divides the signal into two parts and selectively polarises respective signal parts and transmits the two signals to be recombined at the receiver.

Deconstructing the signal into two different signal parts and then selectively polarising the respective signal parts provides technical advantages.

According to one or more embodiments, there is provided a transmitting apparatus. In one embodiment, the transmitting apparatus includes a complementary data generator, a first transmitting module and a second transmitting module. The complementary data generator generates 0° in-phase optical signals and 180° out-of-phase optical signals based upon communication data to be transmitted. In-phase data is transmitted using first transmitting module and out-of-phase data is transmitted using second transmitting module. The first transmitting module includes a plurality of first visible light sources for generating a plurality of first optical signals and a first transmitting polarization lens for polarizing the first optical signals to generate plurality of first polarized optical signals. The second transmitting module includes a plurality of second visible light sources for generating a plurality of second optical signals and a second transmitting polarization lens for polarizing the second optical signals to generate plurality of second polarized optical signals. A polarization of the first transmitting polarization lens is orthogonal to a polarization of the second transmitting polarization lens.

According to one or more embodiments, there is provided a receiving apparatus for visible light communication. In one embodiment, the receiving apparatus includes a first receiving module, a second receiving module and a differential amplification module. The first receiving module includes a photodiode for receiving the plurality of first polarized optical signals and a first receiving polarization lens to pass the plurality of first polarized optical signals. The second receiving module includes a photodiode for receiving the plurality of second polarized optical signals and a second receiving polarization lens to pass the plurality of second polarized optical signals. A polarization of the first receiving polarization lens is orthogonal to a polarization of the second receiving polarization lens. The differential amplification module consists of a differential amplifier that generates demodulated data after differential amplification of received data from first receiving module and second receiving module.

According one or more embodiments, there is provided a visible light communication system. In one embodiment, the visible light communication system includes a transmitting terminal and a receiving terminal. The transmitting terminal includes a complementary data generator, a first transmitting module and a second transmitting module. The complementary data generator generates 0° in-phase optical signals and 180° out-of-phase optical signals based upon communication data to be transmitted. In-phase data is transmitted using first transmitting module and out-of-phase data is transmitted using second transmitting module. The first transmitting module includes a plurality of first visible light sources for generating a plurality of first optical signals and a first transmitting polarization lens for polarizing the first optical signals to generate plurality of first polarized optical signals. The second transmitting module includes a plurality of second visible light sources for generating a plurality of second optical signals and a second transmitting polarization lens for polarizing the second optical signals to generate plurality of second polarized optical signals, A polarization of the first transmitting polarization lens is orthogonal to a polarization of the second transmitting polarization lens. The receiving terminal includes a first receiving module, a second receiving module and a differential amplification module. The first receiving module includes a photodiode for receiving the plurality of first polarized optical signals and a first receiving polarization lens to pass the plurality of first polarized optical signals. The second receiving module includes a photodiode for receiving the plurality of second polarized optical signals and a second receiving polarization lens to pass the plurality of second polarized optical signals. A polarization of the first receiving polarization lens and the polarization of the first transmitting polarization lens are the same, and a polarization of the second receiving polarization lens and the polarization of second transmitting polarization lens are the same. The differential amplification module consists of a differential amplifier that generates demodulated data after differential amplification of received data from first receiving module and second receiving module. The demodulated data is resistant to optical noise interference and other non-polarized light sources.

In one or more embodiments, the disclosure provides a transmitting apparatus, a receiving apparatus and a visible light communication system. The disclosure may be used for wireless optical communication to increase bit error rate (BER) under the influence of optical noise sources.

FIG. 1 illustrates a block diagram of visible light communication system in an embodiment. The visible light communication system includes a transmitting apparatus 10 and a receiving apparatus 20. Data is sent from transmitting apparatus 10 to receiving apparatus 20. The transmitting apparatus includes three transmitting modules 100-1, 100-2 and 100-3.

The transmitting module 100-1 includes a complementary data generator. The complementary data generator generates 0° in-phase optical signals and 180° out-of-phase optical signals based upon communication data to be transmitted. In-phase data is transmitted using first transmitting module 100-2 and out-of-phase data is transmitted using second transmitting module 100-3. The transmitting module 100-2 (or called a first transmitting module) includes a plurality of first visible light sources 101-2 and a transmitting polarization lens 102-2 (or called a first transmitting circular polarization lens). The first visible light source 101-2 generates a plurality of first optical signals and the transmitting polarization lens 102-2 polarizes the first optical signals. The transmitting module 100-3 (or called a second transmitting module) includes a plurality of second visible light sources 101-3 and a transmitting polarization lens 102-3 (or called a second transmitting circular polarization lens). The second visible light source 101-3 generate a plurality of second optical signals and the transmitting polarization lens 102-3 polarizes the second optical signals. The polarization of the two transmitting polarization lenses 102-2 and 102-3 are orthogonal to each other.

The receiving apparatus 20 includes a receiving module 200-1 (or called a first receiving module), a receiving module 200-2 (or called a second receiving module) and a receiving module 200-3 (or called the differential amplification module). The receiving module 200-1 includes a photodiode 201-1 for receiving the plurality of first polarized optical signals and a receiving polarization lens 202-1 (or called a first receiving circular polarization lens) to pass the plurality of first polarized optical signals. The receiving module 200-2 includes a photodiode 201-2 for receiving the plurality of second polarized optical signals and a receiving polarization lens 202-2 (or called a second receiving circular polarization lens) to pass the plurality of second polarized optical signals. The receiving module 200-3 includes a differential amplifier that generates demodulated data after differential amplification of received data from first receiving module 200-1 and second receiving module 200-2.

The polarization of the receiving polarization lens 202-1 and the polarization of the transmitting polarization lens 102-2 are the same and the polarization of the receiving polarization lens 202-2 and the polarization of the transmitting polarization lens 102-3 are the same. For example as shown in FIG. 1, the transmitting polarization lens 102-2 and the receiving polarization lens 202-1 are right-handed circular polarizers, and the transmitting polarization lens 102-3 and the receiving polarization lens 202-2 are left-handed circular polarizers. The right-handed circular polarized light from transmitter module 100-2 is guided to right-handed circular polarized lens 202-1 to be received by photodiode 201-1 of receiving module 200-1. The left-handed circular polarized light from transmitter module 100-3 is guided to left-handed circular polarized lens 202-2 to be received by photodiode 201-2 of receiving module 200-2. Moreover, the right-handed circular polarized light from transmitter module 100-2 will be blocked by left-handed circular polarized lens 202-2 of receiving module 200-2 and left-handed circular polarized light from transmitter module 100-3 will be blocked by right-handed circular polarized lens 202-1 of receiving module 200-1. Differential amplification is performed by receiving module 200-3 that generates demodulated data after differential amplification of received data from first receiving module 200-1 and second receiving module 200-2. Any optical noise (or un-polarized light) will reach photodiode 201-1 of receiving module 200-1 and photodiode 201-2 of receiving module 200-2 with equal intensity and will be cancelled out by differential amplifier of receiving module 200-3.

Figure 2:
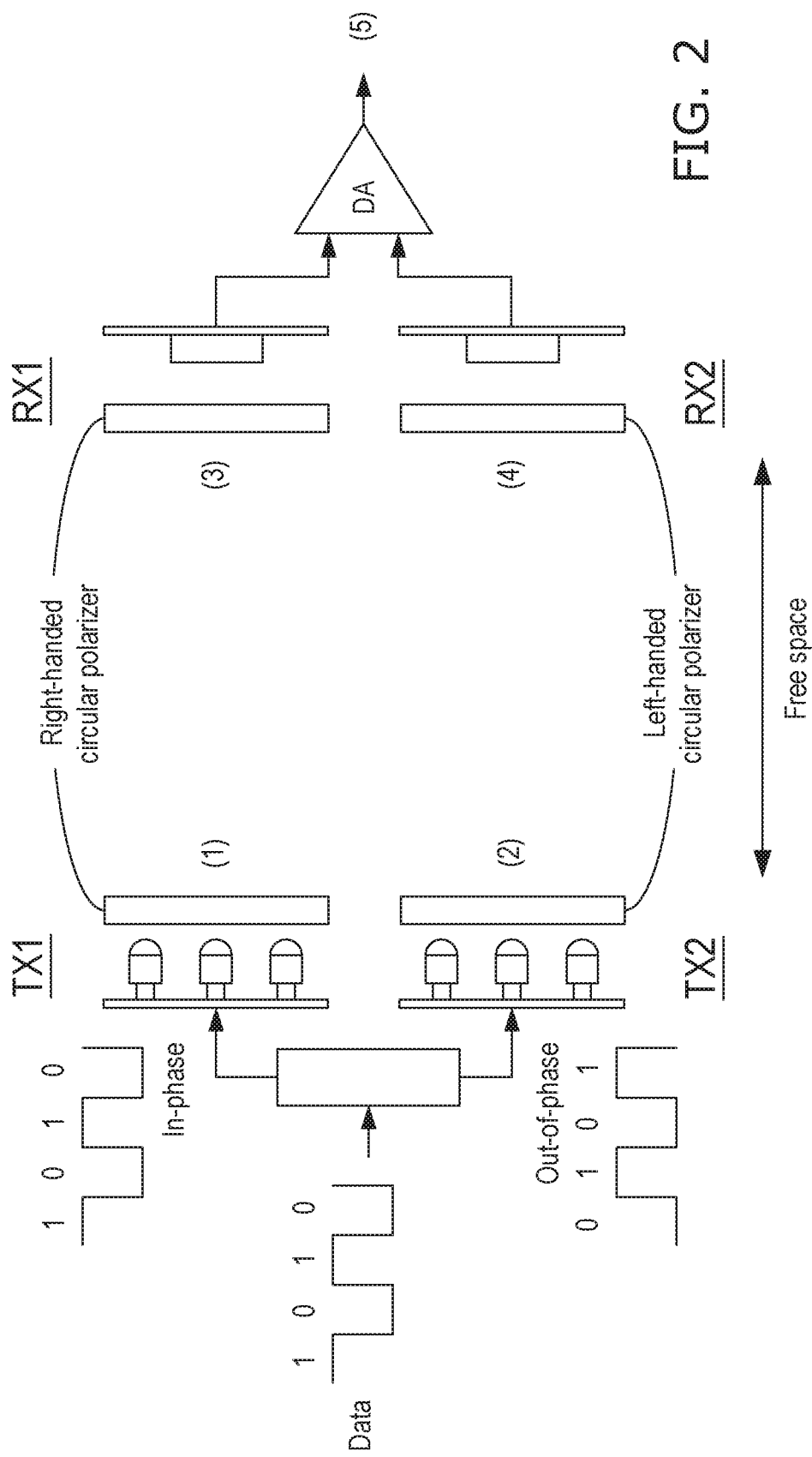
FIG. 2 is a schematic view of an embodiment.

An experiment based upon light emitting diodes is illustrated in FIG. 2. The data to be transmitted is first converted into 0° in-phase and 180° out-of-phase data. The 0° in-phase data is sent to TX1 and 180° out-of-phase data is sent to TX2. TX1 and TX2 operate simultaneously in a complementary way based upon incoming data. If the data to be transmitted is a '1', TX1 is ON and TX2 is OFF, similarly, when the data to be transmitted is a '0', TX2 is ON and TX1 is OFF. TX1 emits an optical signal with right-handed circular polarization at position (1) and is received by the receiving terminal at position (3). Herein, since the optical signal with right-handed circular polarization is blocked by the left-handed circular polarizer at the position (4), the optical signal will not be received by RX2 at position (4). Similarly, TX2 emits an optical signal with left-handed circular polarization at position (2) and is received by the receiving terminal at position (4). Herein, since the optical signal with left-handed circular polarization is blocked by the right-handed circular polarizer at the position (3), the optical signal will not be received by RX1 at position (3). Differential amplification of received optical signal at RX1 and RX2 is performed to demodulate the transmitted signal. In this way, any un-polarized optical noise will reach point (3) and (4) with same intensity and hence will be cancelled out after differential amplification at point (5).

Figure 3A:
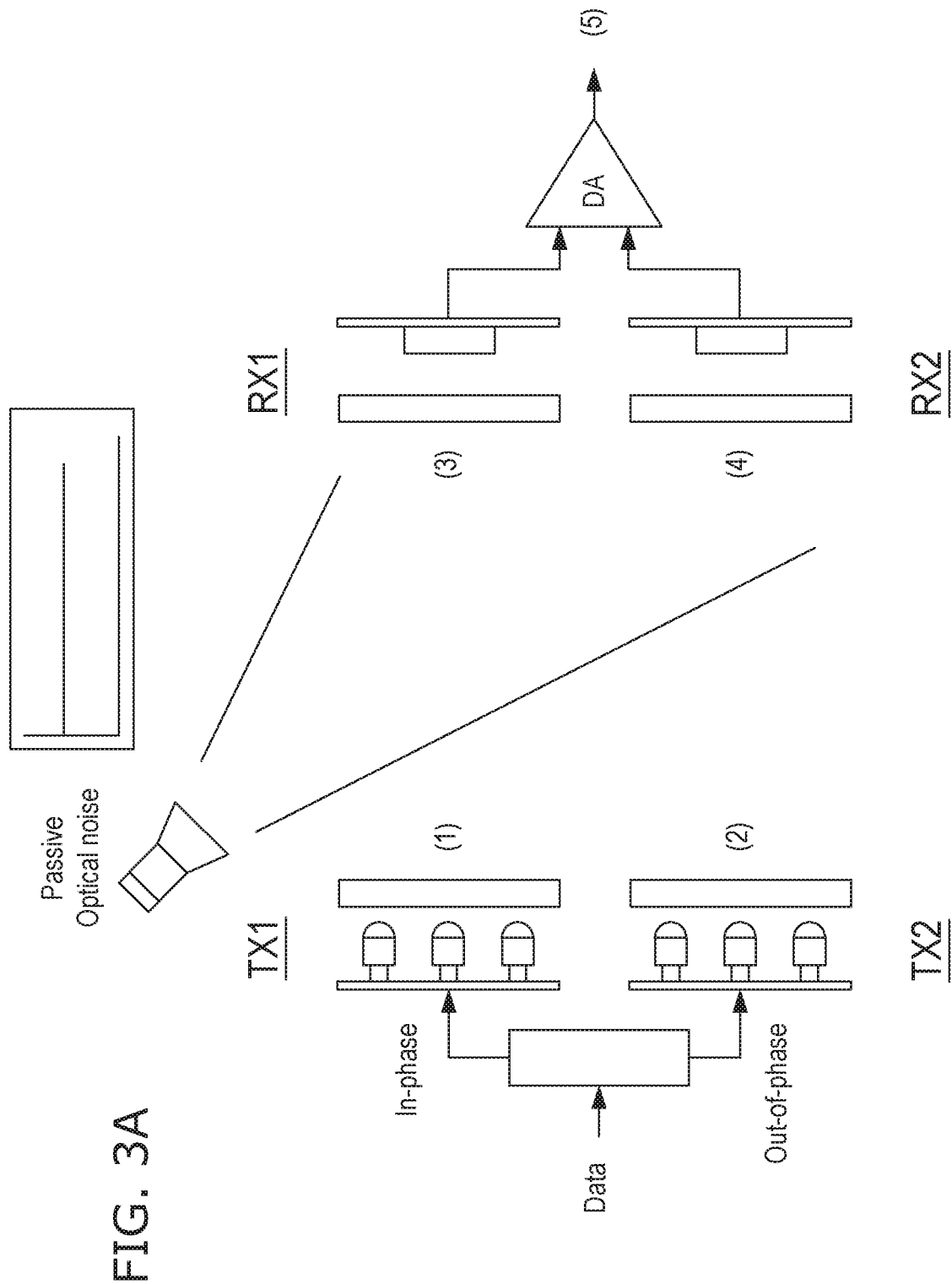
FIG. 3A and FIG. 3B are schematic views of optical noise interference in an embodiment.
Figure 3B:
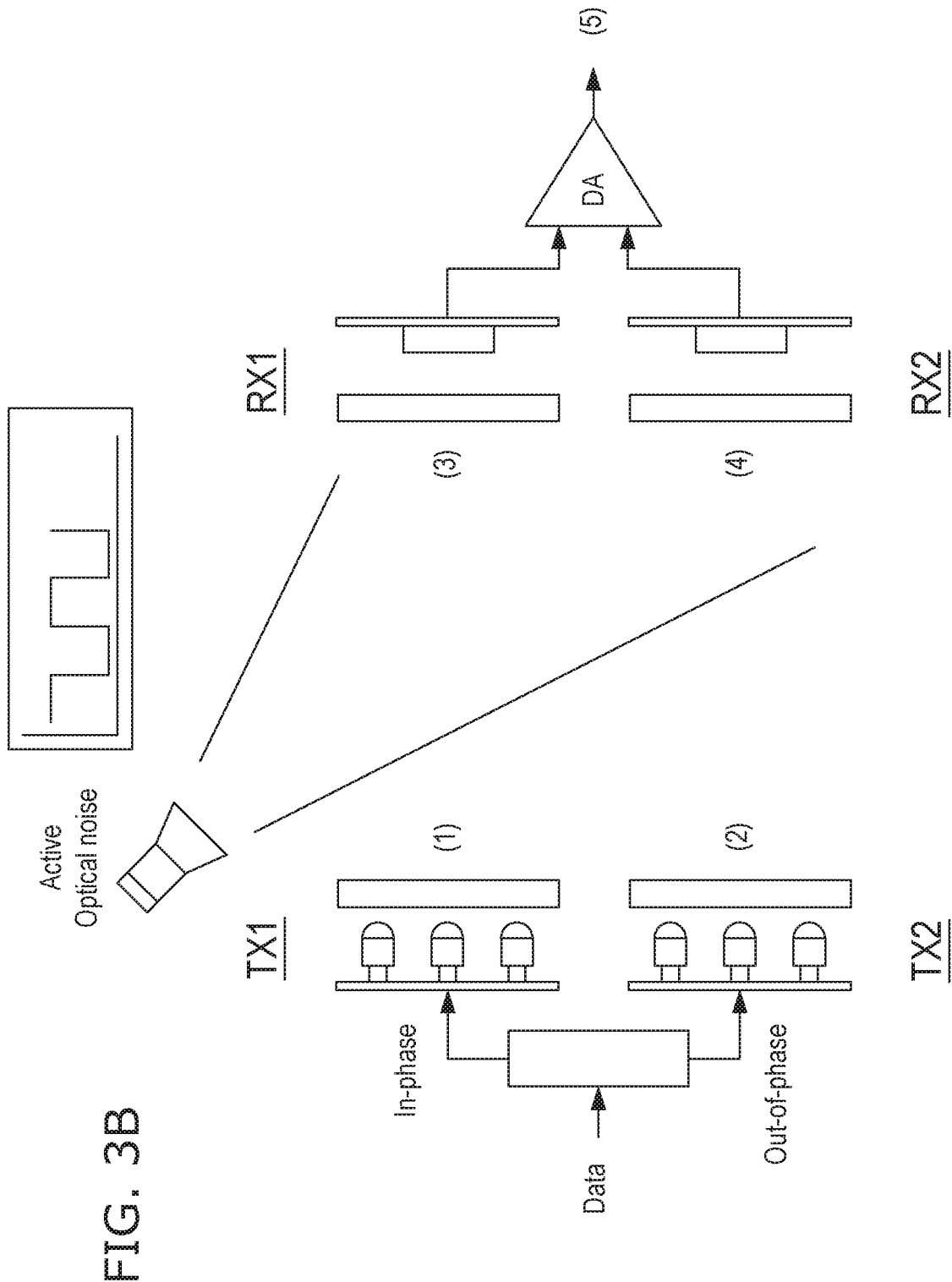

Consider two experimental setups shown in FIG. 3A and FIG. 3B. FIG. 3A includes a passive optical noise source which is a constant light source not transmitting any optical signal. FIG. 3B includes an active noise source which is also transmitting optical signals in similar frequency band as that of communication data.

Figure 4B:
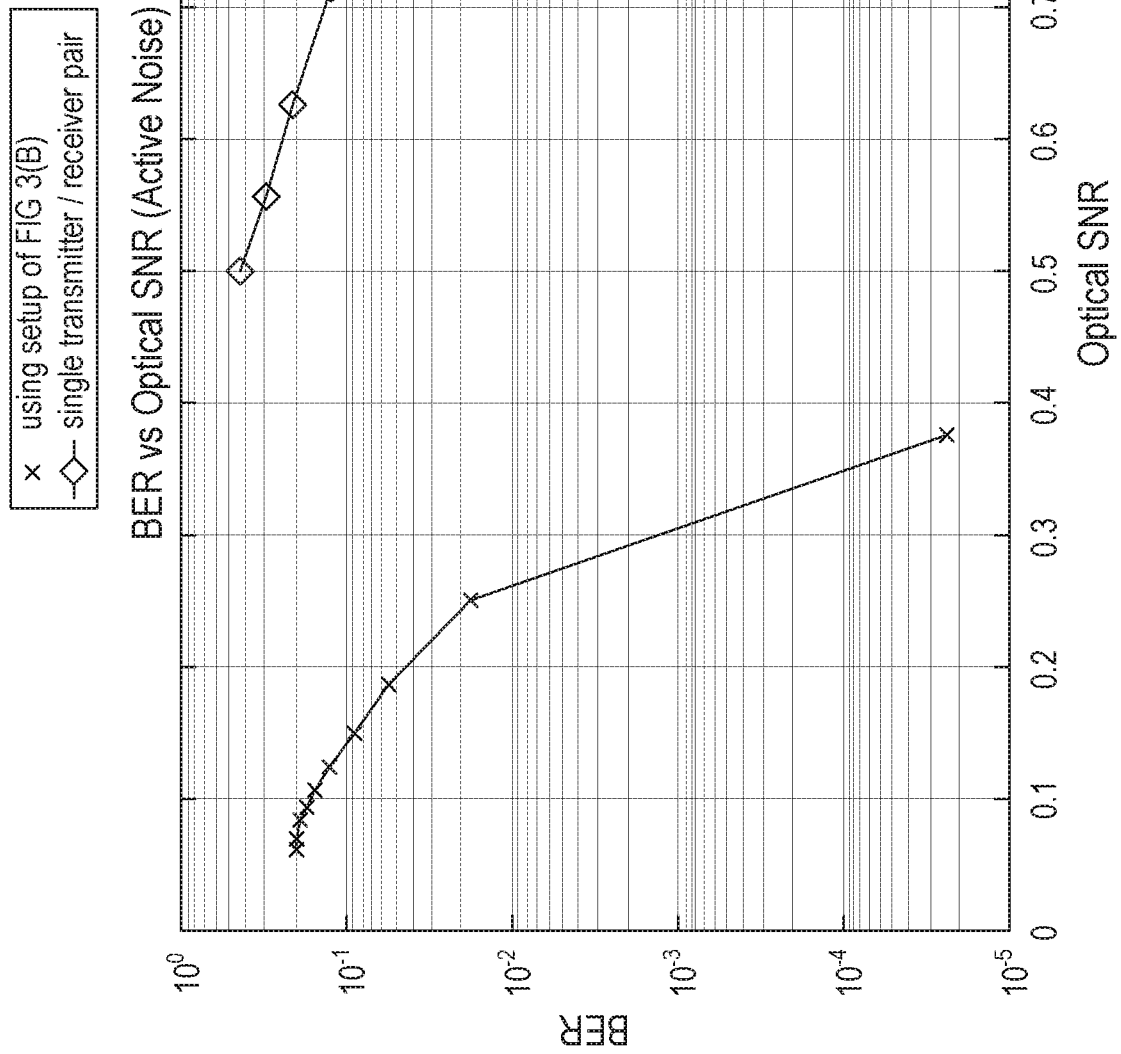

Communication data at the frequency of 40 KHz is supplied to complementary data generator which converts this data to in-phase and out-of-phase data to be provided to TX1 and TX2 simultaneously. TX1 and TX2 utilize on-off keying (OOK) to modulate the data. The distance between the transmitting apparatus and receiving apparatus is about 2 meter. The experimental results on the bit error rate (BER) are shown in FIG. 4A and FIG. 4B. Current embodiment can tolerate 22.3% less signal-to-noise ratio (SNR) under passive noise and 32.6% less SNR under active noise interference when compared with single transmitter/receiver pair to maintain BER of $10^{-3}$.

In one or more of the above embodiments, the visible light sources 101-2 and 101-3 may be light emitting diodes (LED) or laser diodes (LD) or any possible combination thereof.

In one or more of the above embodiments, the photodiodes 201-1 and 201-2 are P-intrinsic-N (PIN) photodiodes, avalanche photodiodes (APD), charge-coupled devices (CCD) or any possible combination thereof.

This work proposes a robust VLC transceiver architecture for establishing a noise tolerant optical link independent of data and noise frequency. The transmitter utilizes polarization property of light to transmit differential optical signals. The receiver employs differential amplification together with polarization to realize common optical noise rejection. The result is a low BER robust optical link even with both data and optical noise operating in similar frequency bands.

This architecture also increases the probability of successful decoding of data by receiver in case of partial channel blockage/PD saturation.

Section II describes the proposed system architecture. Implementation details are illustrated in section III and results are evaluated in section IV. Finally, the paper is concluded in section V.

System Architecture

Figure 5:
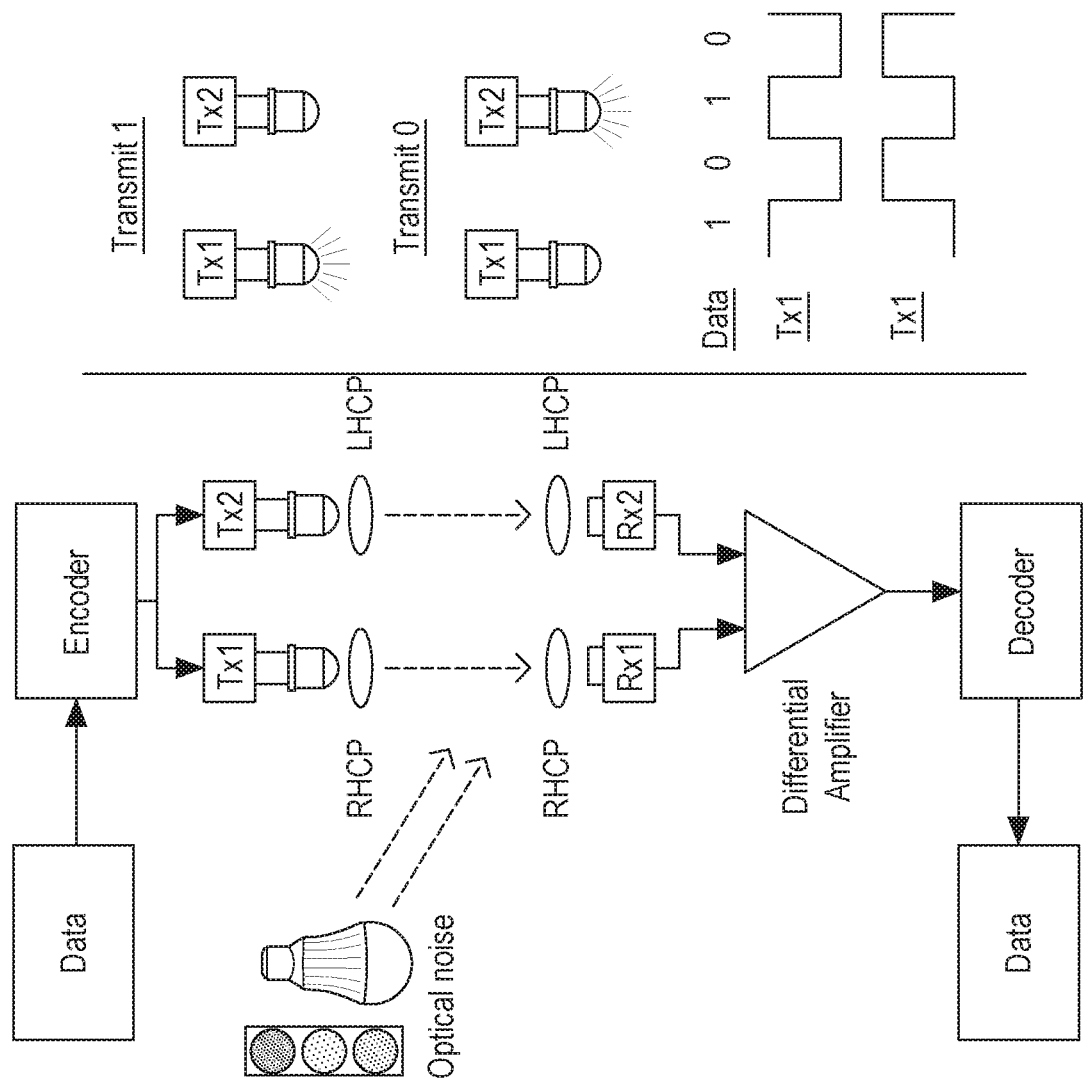
FIG. 5 is a schematic representation of a system architecture of a VLC transceiver.

The proposed transceiver architecture incorporates differential data transmission and reception by exploiting polarization property of light. The incoming binary data is first converted to differential form using an encoder and is transferred to two optical front ends namely Tx1 and Tx2. Tx1 and Tx2 operate simultaneously in a complementary way based upon differential data. If the data to be transmitted is a '1', Tx1 is ON and Tx2 is OFF, similarly, when the data to be transmitted is a '0', Tx2 is ON and Tx1 is OFF. Polarization of the emitted light is then performed using circular polarization filters. The system architecture is shown in FIG. 5.

Right Handed Circular Polarization (RHCP) is used for Tx1/Rx1 pair and Left Handed Circular Polarization (LHCP) is used for Tx2/Rx2 pair. This configuration exploits the polarization property of light such that light emitted by Tx1 will only be received by Rx1 and will be blocked by the LHCP of Rx2 and vice versa. Differential amplification is carried out in the next stage to reconstruct original data. Any un-polarized light in the vicinity will be considered as optical noise reaching Rx1 and Rx2 by approximately equal intensity that will be cancelled out due to differential amplification employing common-mode noise rejection.

Transmitter

Figure 6:
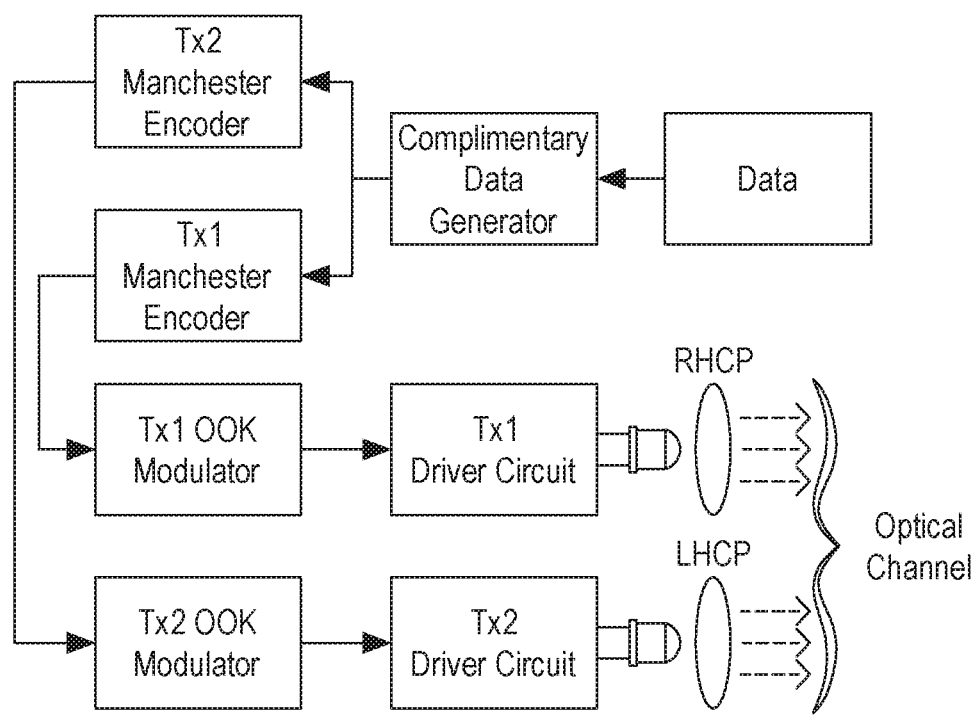
FIG. 6 is a schematic representation of a transmitter architecture.

Transmitter architecture starts with the conversion of binary data to complementary data signal separated into two subtransmitters Tx1 and Tx2. Tx1 comprises of in-phase data whereas Tx2 consists of 180 degree out-of-phase data with respect to the incoming binary data. Run Length Limited (RLL) code is employed to decrease the intra-frame flicker and maximize optical intensity by breaking the long runs of 1s and 0s and maintaining a DC balance at the output. Due to easier clock recovery at receiver and inherent noise mitigation properties [13], Manchester encoding is selected to impose Run Length Limitation on transmitted data. Data is then modulated using On-Off-Keying (OOK). This modulated data is then sent to LED driver circuit of each Tx module. The light emitted from LEDs is then polarized using polarizing filters. Tx1 data is polarized using Right-Handed-Circular (RHO) polarizing filter while Tx2 data is polarized using Left-Handed-Circular (LHC) polarizing filter. Transmitter architecture is shown in FIG. 6.

Receiver

Figure 7:
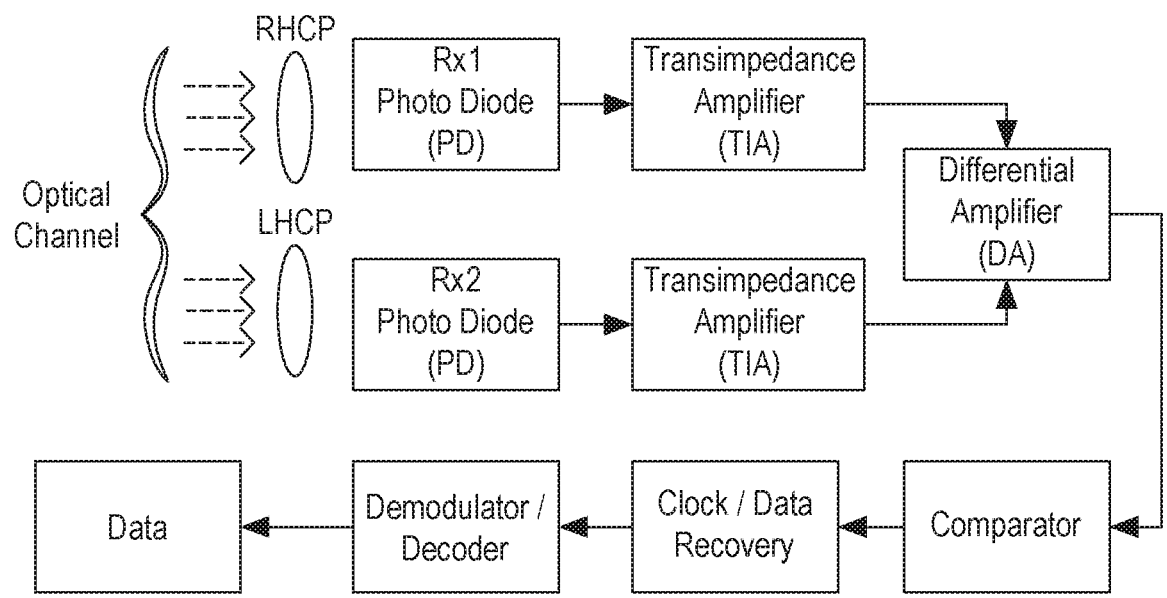
FIG. 7 is a schematic representation of a receiver architecture.

The receiver circuit comprises of two receiving front ends, Rx1 and Rx2, containing separate Photo Diodes (PD). Rx1 employs Right-Handed-Circular (RHO) polarizing filter while Rx2 comprises of Left-Handed-Circular (LHC) polarizing filter. The phenomenon behind the polarization is that RHO polarized signal of Tx1 will be totally blocked by the LHC polarizing filter of Rx2. Similarly, LHC polarized signal of Tx2 will be totally blocked by the RHC polarizing filter of Rx1 regardless of the distance between the Tx/Rx pair. This architecture ensures that the PD of each receiver front end will only receive the light emitted by the corresponding transmitter front end for successful receiving of data. The varying output current of PD is then converted to voltage using Transimpedance Amplifier (TIA) and transmitted to Differential Amplifier (DA), DA amplifies the difference of out-of-phase data received from both receiver front ends thereby improving the SNR. Moreover, this DA architecture discards any common optical noise sensed by both receiver front ends making the system noise tolerant. This DA based noise tolerant architecture makes the system independent of optical noise frequency. The output of the DA is then sent to Comparator for digital conversion. The digital back end is responsible for clock recovery and data sampling followed by the Manchester decoder/demodulator to retrieve the original binary data. The receiver architecture is shown in FIG. 7.

The DA based transceiver architecture together with added benefits of polarization improves the receiver robustness as:

1) The receiver will successfully reject any common optical noise observed by both receiving front ends making it a frequency independent noise tolerant system.

2) The receiver would be able to receive/decode data in noisy channel environment even if one of the receiver front end is partially/fully blocked or becomes saturated.

3) Receiver end polarization will minimize multi-path optical reflections to reach PD. Moreover, it will also diminish glare effect from multiple surfaces triggering PD saturation.

The proposed transceiver architecture is modelled under noisy channel conditions. Noise sources are categorized as both passive and active. Passive noise is a constant light source in the Field-of-View (FoV) of receiver. These could be one or more background light sources in the vicinity of receiver which can have a combined effect towards receiver saturation. We model these noise sources combined together as a constant DC value. Active noise is one or more high frequency VLC transmitters in the FoV of receiver affecting transmission channel. This active noise is modelled as high frequency White Gaussian Noise (WGN).

Let X represent the binary data to be transmitted over the channel. Xi and Xj represent in phase and out of phase signals of X respectively. Then the received signal at both the receiver front ends is represented by Yi and Yj.

$$Y_i = X_i + Z_i + a$$

$$Y_j = X_j + Z_j + b$$

where $Z_x$ is White Gaussian Noise.

$a$ and $b$ are constant background DC noise

The output of DA is given by Yz.

$$Y_z = Y_i - Y_j$$

$$Y_z = X_i + Z_i + a - X_j - Z_j - b$$

It is assumed that both the receiver front ends undergo comparable noise levels which would result in $$Z_i - Z_j \approx 0$$

$$a - b \approx 0$$

which implies $$Y_z \approx X_i - X_j$$

This noise tolerant signal Yz has additional capability of channel independence. Since both Xi and Xj contains information of original binary signal, therefore, if either one is partially or fully blocked, the receiver would still be able to reconstruct the original signal from the other successfully.

System Implementation

The proposed VLC transceiver implementation conforms to IEEE standard 802.15.7 is operating at PHY 1. The operating range of PHY 1 is 11.67 kb/s to 266.6 kb/s for high current and slow switching outdoor applications [15]. The system is implemented in Xilinx Spartan 3A series FPGA. A Pseudo-Noise (PN) Sequence with eight degree generator polynomial is generated to act as random binary data to be transmitted. This random data is then sent to Complementary Data Generator block that transmits the same data over Tx1 and its complementary data over Tx2. In the next stage, Manchester Encoding is implemented with the help of a simple state machine that runs on twice the clock rate as that of data. These two Manchester Encoded out of phase data streams are then transmitted to their respective daughter boards for OOK modulation and transmission. The two similar daughter boards consists of 3×3 matrix of high bright white LEDs (Cree C503C) along with a driver transistor. The light emitted from the LEDs is then passed through respective polarizing filter for both channels.

Figure 8:
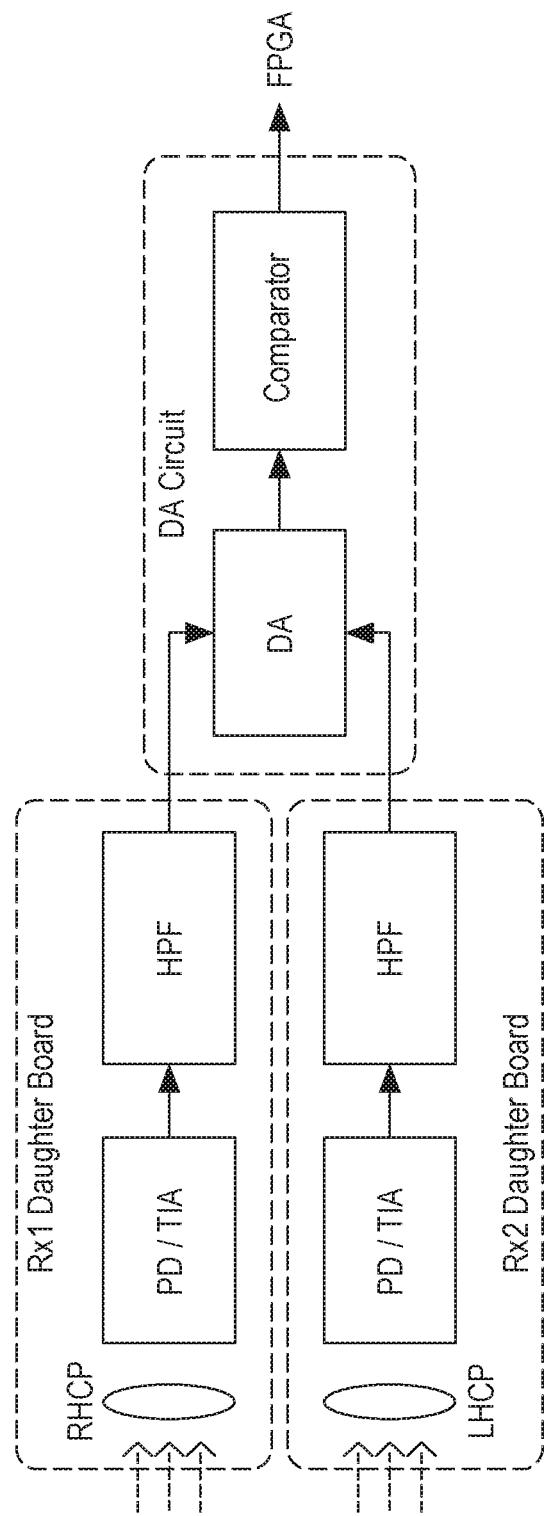
FIG. 8 is a schematic representation of a receiver daughter board and DA configuration.

The receiver implementation is carried out on a separate FPGA board connected with two front end receiver daughter boards through intermediate differential amplification circuitry as shown in FIG. 8.

The optical front end of daughter boards contain OPT series PD (OPT101) from Texas Instruments (TI) with built in TIA. The light reaches PD through an RHC polarizing filter for Tx1 and LHC polarizing filter for Tx2. The signal is then passed through a High Pass Filter (HPF) to filter out DC/low frequency ambient noise. The filtered output is then sent to intermediate circuit for differential amplification (LM324). After differential amplification, level shifting (0 V/3.3 V) is carried out using comparator (MAXIM 942 Series). Data is then sent to FPGA board for decoding. A 16 times faster clock than the optical frequency of transmitter is generated at receiver. Based upon this clock and the optical signal received, a receiver clock is generated to sample the incoming data. After sampling, Manchester Decoding is performed with the help of simple state machine to recover the transmitted data. The data is then transferred to PC for further processing.

Example Setup and Results

Examples are carried out in an indoor lab environment with a constant background illuminance of 313 Ix. We call this as ambient optical noise. The distance between Tx1 and Tx2 is 15 cm while the distance between Tx/Rx pair is varied between 70 cm to 200 cm for different examples. The PN sequence is repeated 15 times to generate 4 Kbits of random data clocked at 20 KHz. The data packet includes the start and stop byte for synchronization purpose. An example configuration and setup is shown in FIGS. 9A and 9B.

Figure 10A:
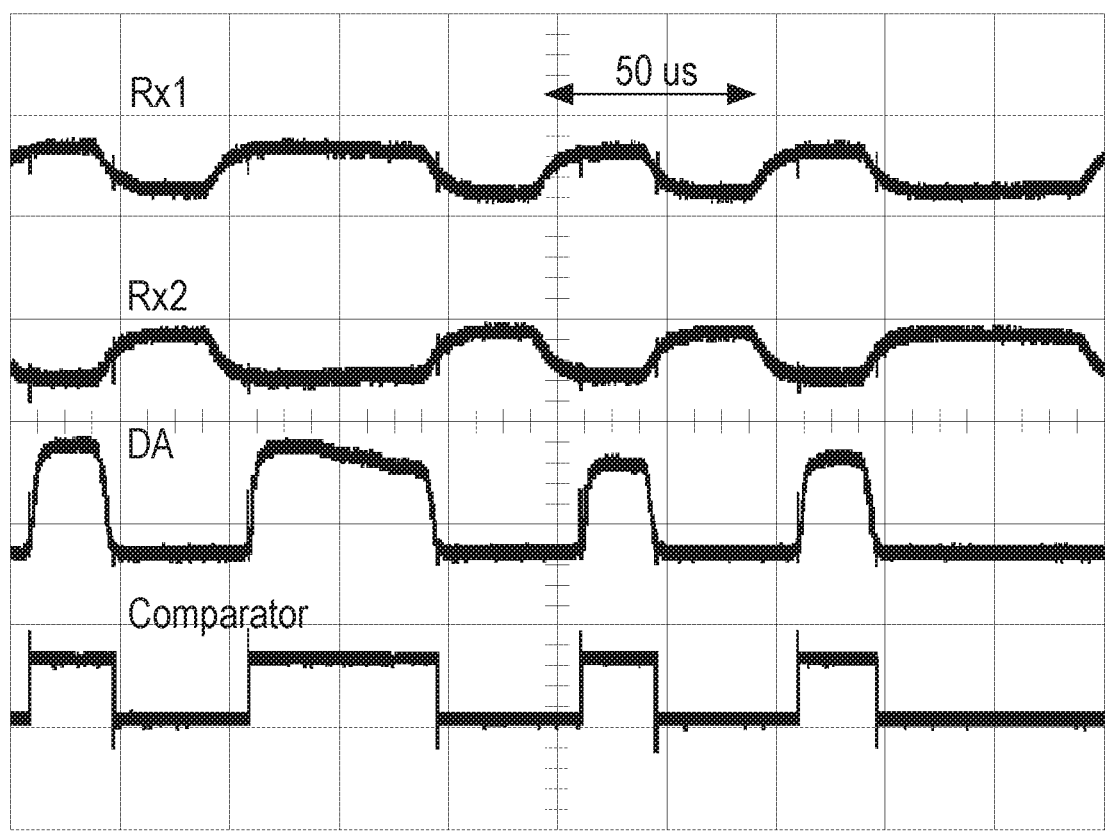
FIG. 10A are output waveforms.
Figure 10B:
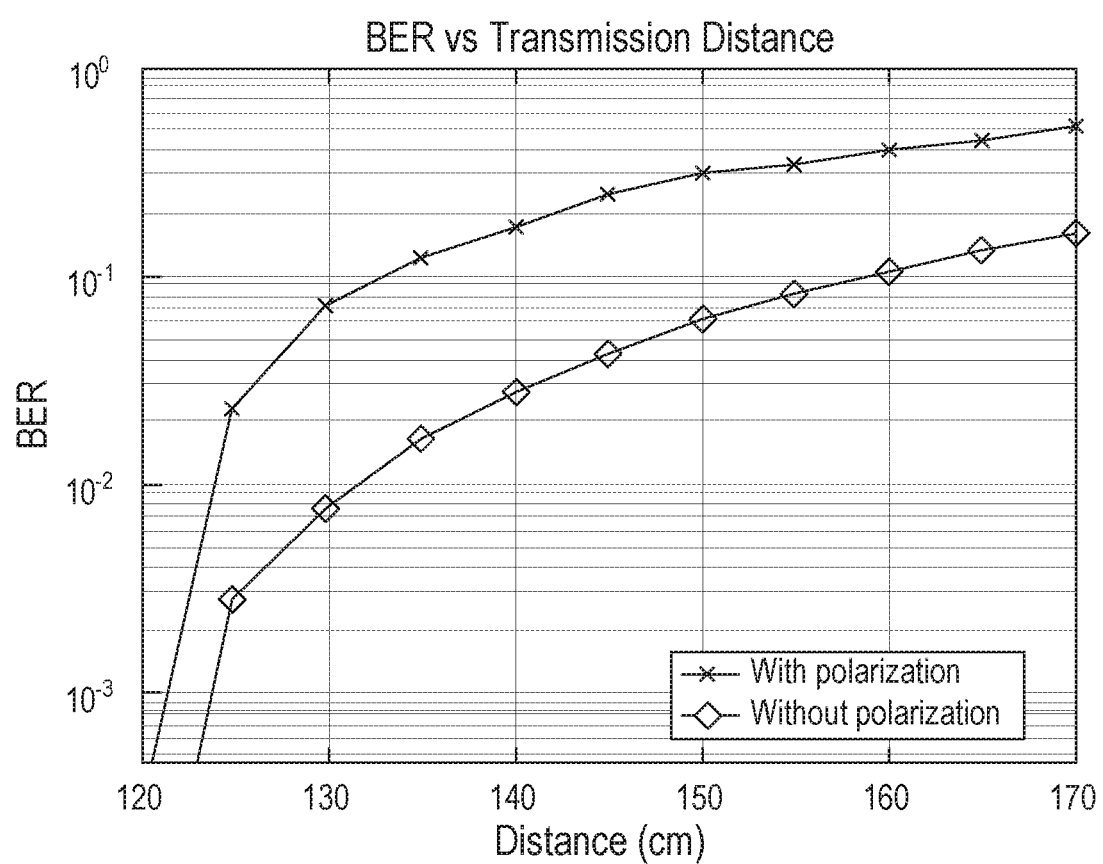
FIG. 10B BER vs Transmission distance.
Figure 10C:
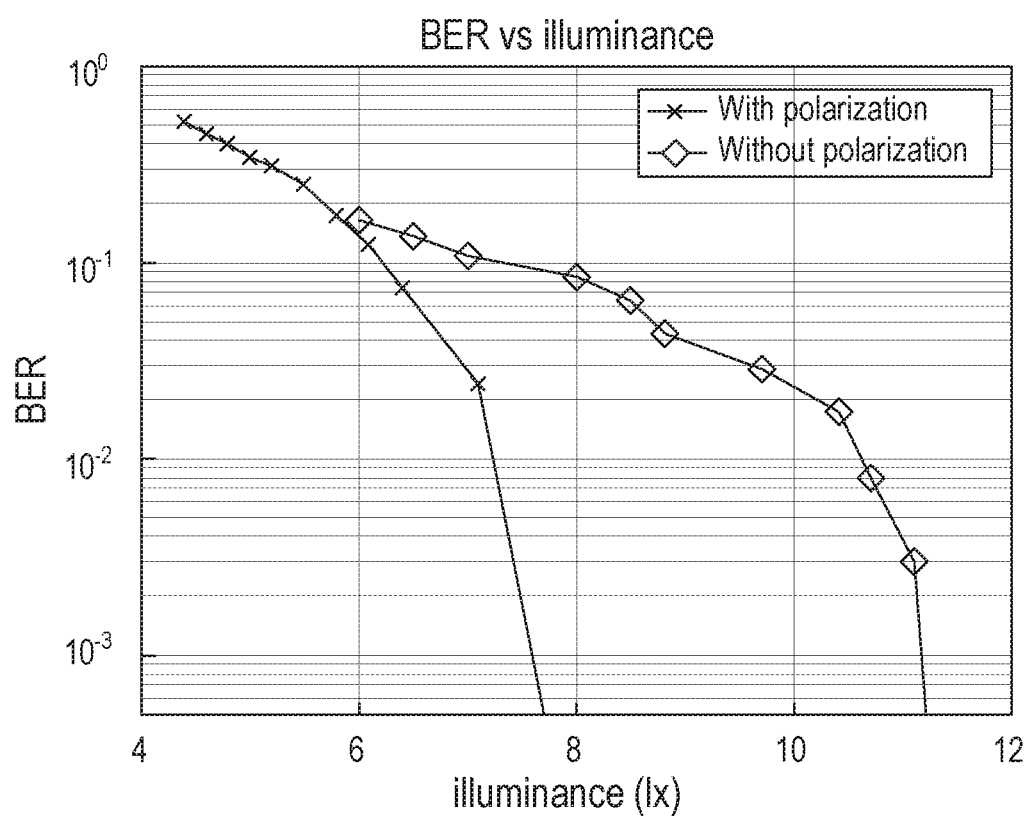
FIG. 10C BER vs illuminance.

The first example was carried out to evaluate the boundary conditions of the system. Without any external noise source except the ambient optical noise, the transmission is error free up to a distance of 120 cm between the Tx/Rx pair. Increasing the distance beyond 120 cm intensifies the Bit Error Rate (BER) due to reduction in signal power caused by the polarization filters. Effect of polarization filtering on transmission distance and illuminance is illustrated in FIGS. 10A-10C.

In order to evaluate the system performance under noisy conditions, two different noisy environments were created. In the first scenario, a bright optical noise source is introduced in the channel to interfere with the signal. We call this a passive noise source since it is a continuous light source without transmitting any data.

First we calculate BER of conventional VLC transceiver architecture comprising of one Manchester encoded Tx/Rx pair without polarization filtering. The distance between the Tx/Rx pair is fixed to 80 cm. At this distance, the signal illuminance as measured at the receiver is 27 Ix. The ambient illuminance is 313 Ix. The distance of optical noise source from receiver is varied to evaluate the system performance under varying noise conditions.

Next, we evaluate the improvement in performance using our proposed transceiver architecture under the same environment.

Figure 11:
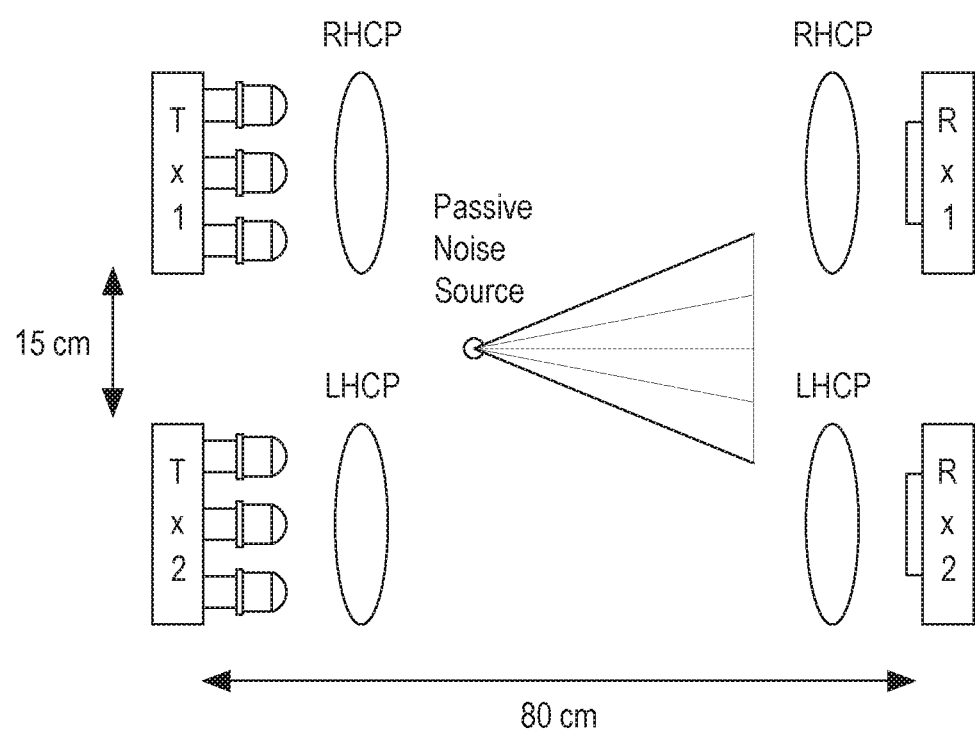
FIG. 11 Example setup incorporating passive noise.

At 80 cm distance, between Tx/Rx pair mounted with polarization filters, the signal illuminance as measured at the receiver is 15 Ix. This reduction in signal illuminance has insignificant effect on transmission distance, however, same BER is achieved at much lower optical SNR. An example setup is shown in FIG. 11.

Figure 12:
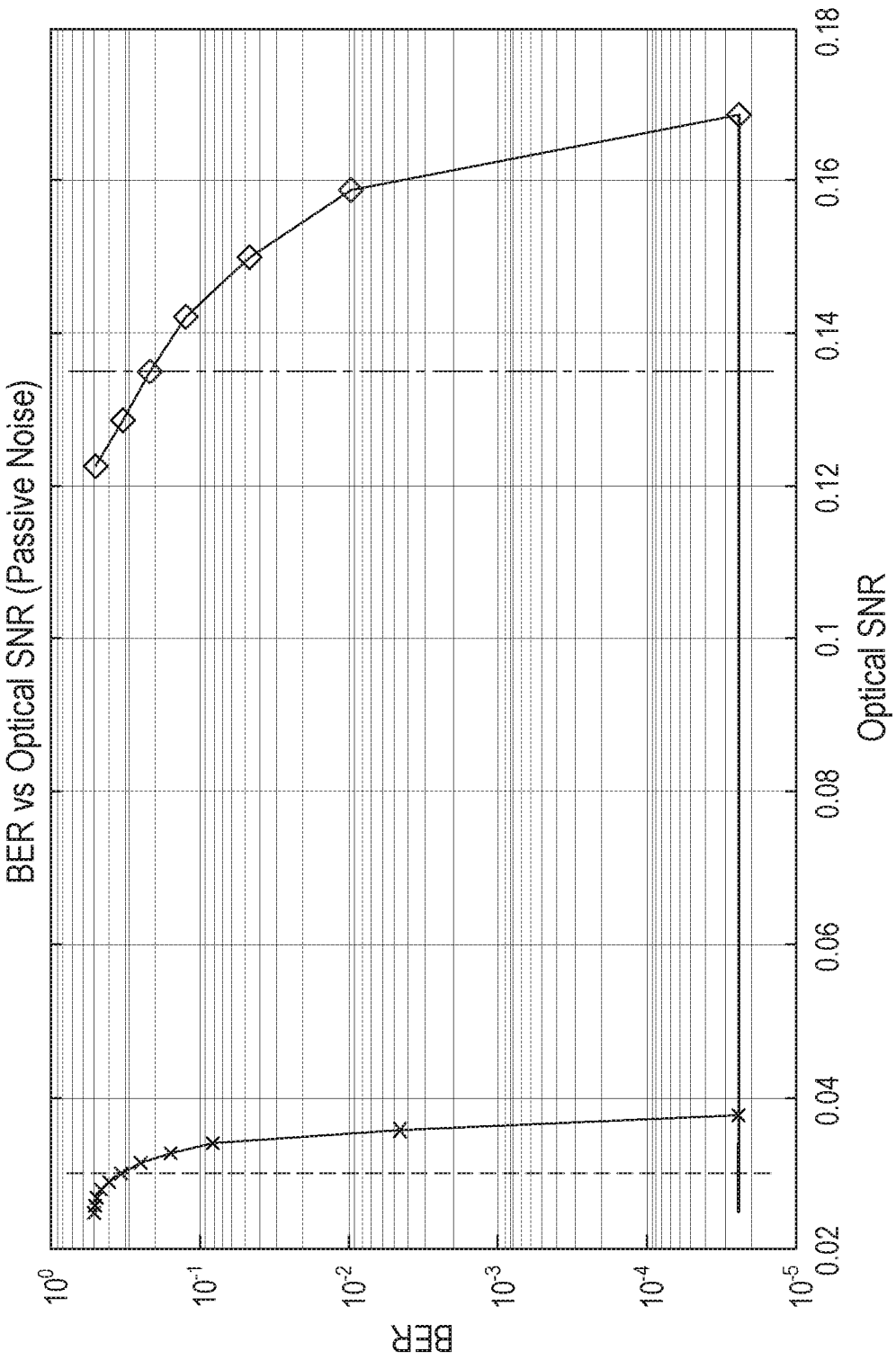
FIG. 12 BER vs optical SNR under passive noise.
Figure 13A:
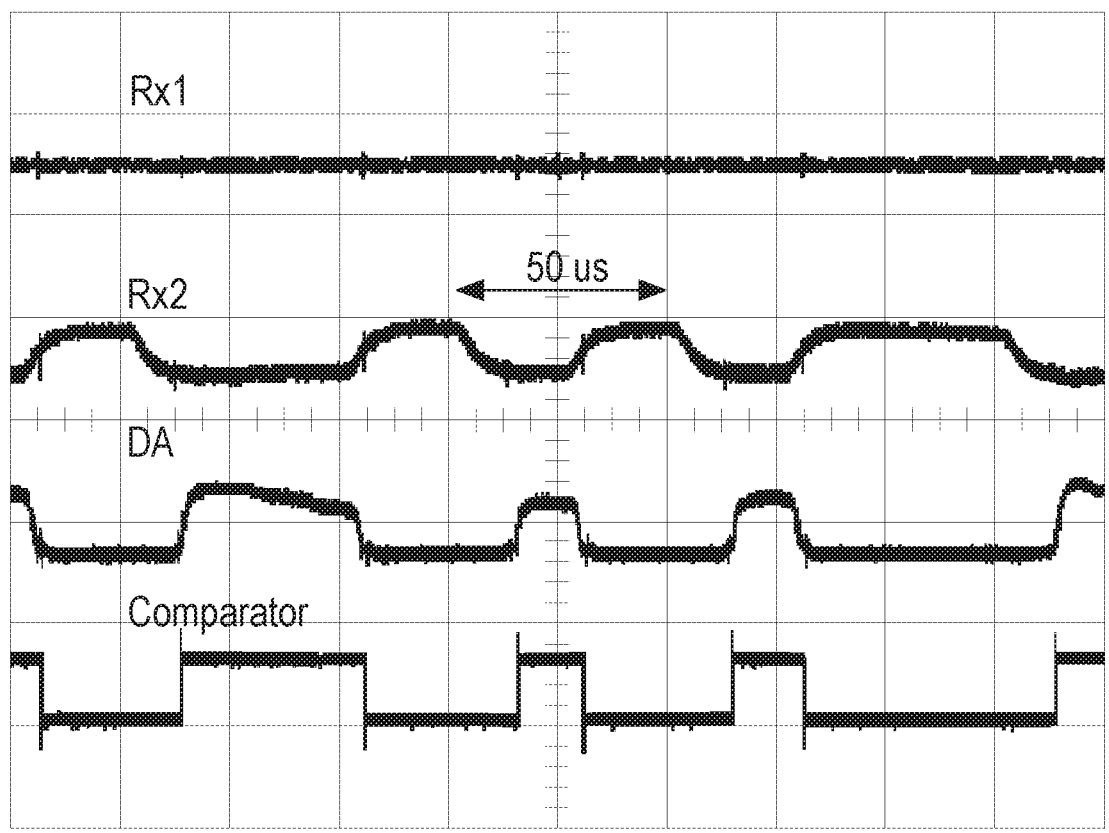
FIG. 13A Output waveforms under PD saturation condition—RX1 saturated under passive noise condition.
Figure 13B:
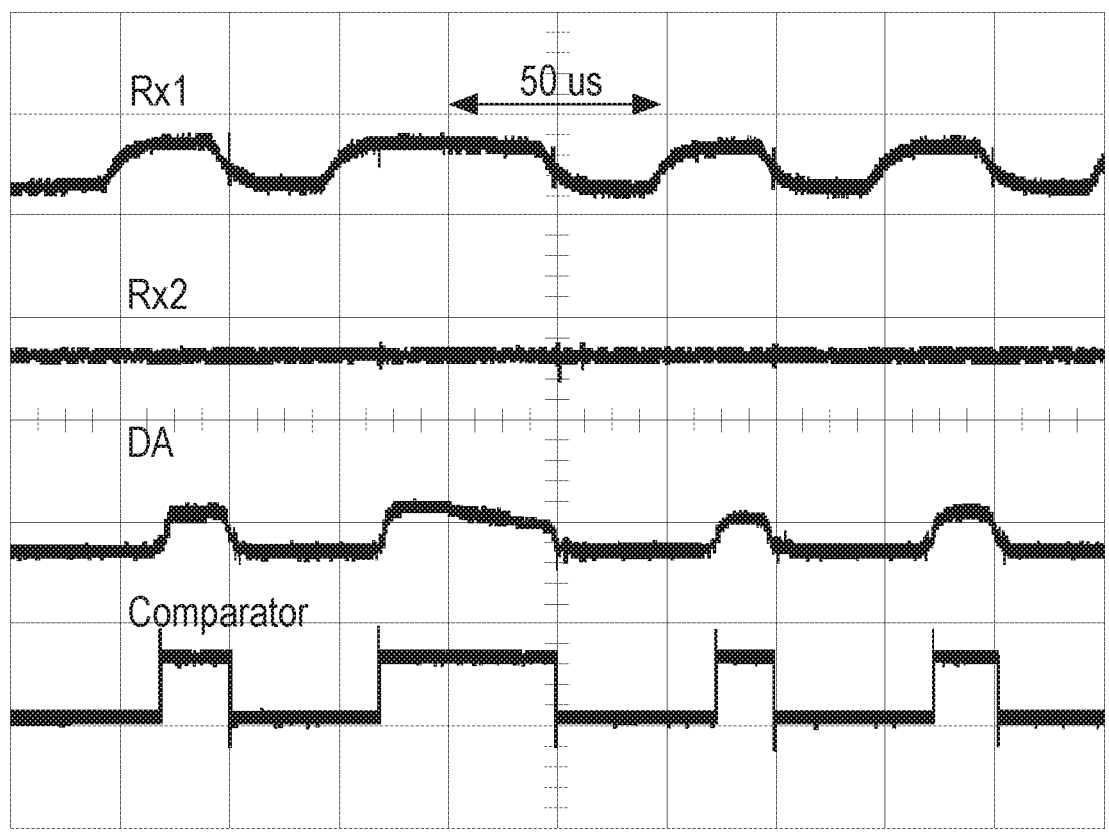
FIG. 13B Output waveforms under PD saturation condition—RX2 saturated under passive noise condition.

The BER vs Optical SNR is shown in FIG. 12. Green curve indicates the BER for conventional VLC transceiver. Saturation point indicates the SNR value at which the PD gets saturated. Blue curve depicts BER for proposed architecture which is high near saturation point if both the receivers are saturated or blocked by the noise source. Moving away from the threshold point with increasing SNR results an abrupt decrease in BER. Magenta curve demonstrates the special case of proposed receiver architecture. In this case, either Rx1 or Rx2 gets partially or fully saturated/blocked by the optical noise source. The other receiver maintain the Line of Sight (LOS) with the transmitter. Although the amplitude of DA output is reduced, the receiver is still able to accomplish error free decoding and maintain very low BER by adjusting the threshold level of comparator as depicted in FIGS. 13A and 13B.

In the next scenario, a bright optical noise source is introduced in the channel which is also an active VLC transmitter. We call this an active noise source since it is also transmitting data in similar frequency band as that of our data signal. First we perform the example using conventional VLC transceiver without polarization filtering. The distance between the Tx/Rx pair and signal illuminance remains unchanged. The active noise source is transmitting random data at an optical frequency of 20 KHz resulting in spectral overlap with the data.

Figure 14:
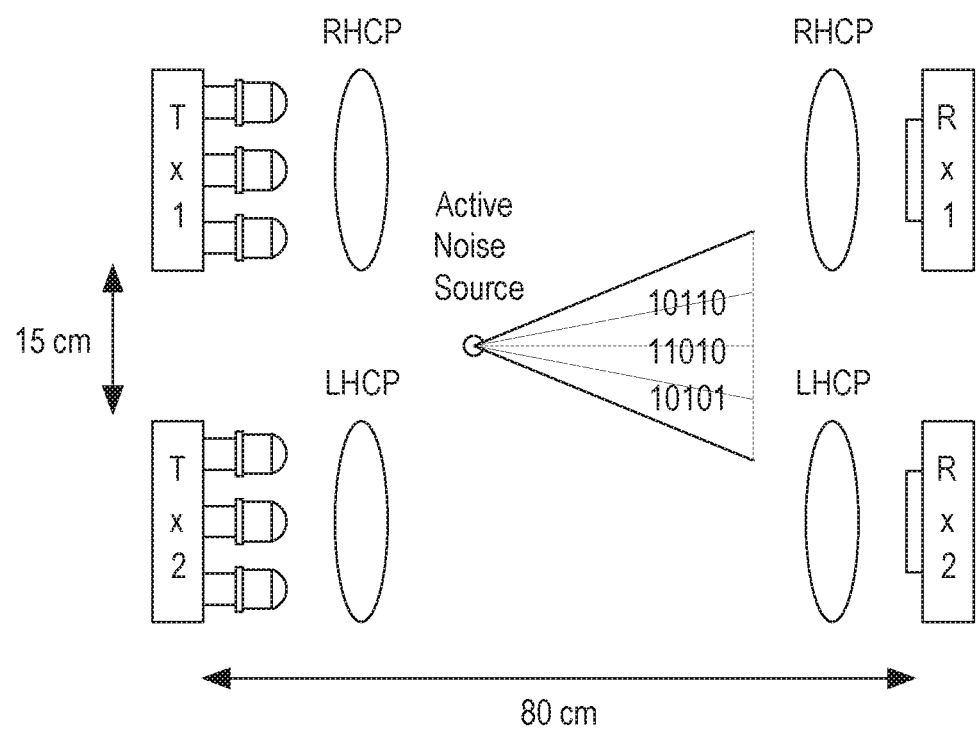
FIG. 14 Example setup incorporating active noise.

For comparison, the example is repeated using proposed VLC transceiver. The example was conducted in a controlled environment that ensures a clear line of sight between the active noise source and both the receivers to maximize noise interference with similar noise illuminance reaching the receivers. An example configuration is shown in FIG. 14.

Figure 15:
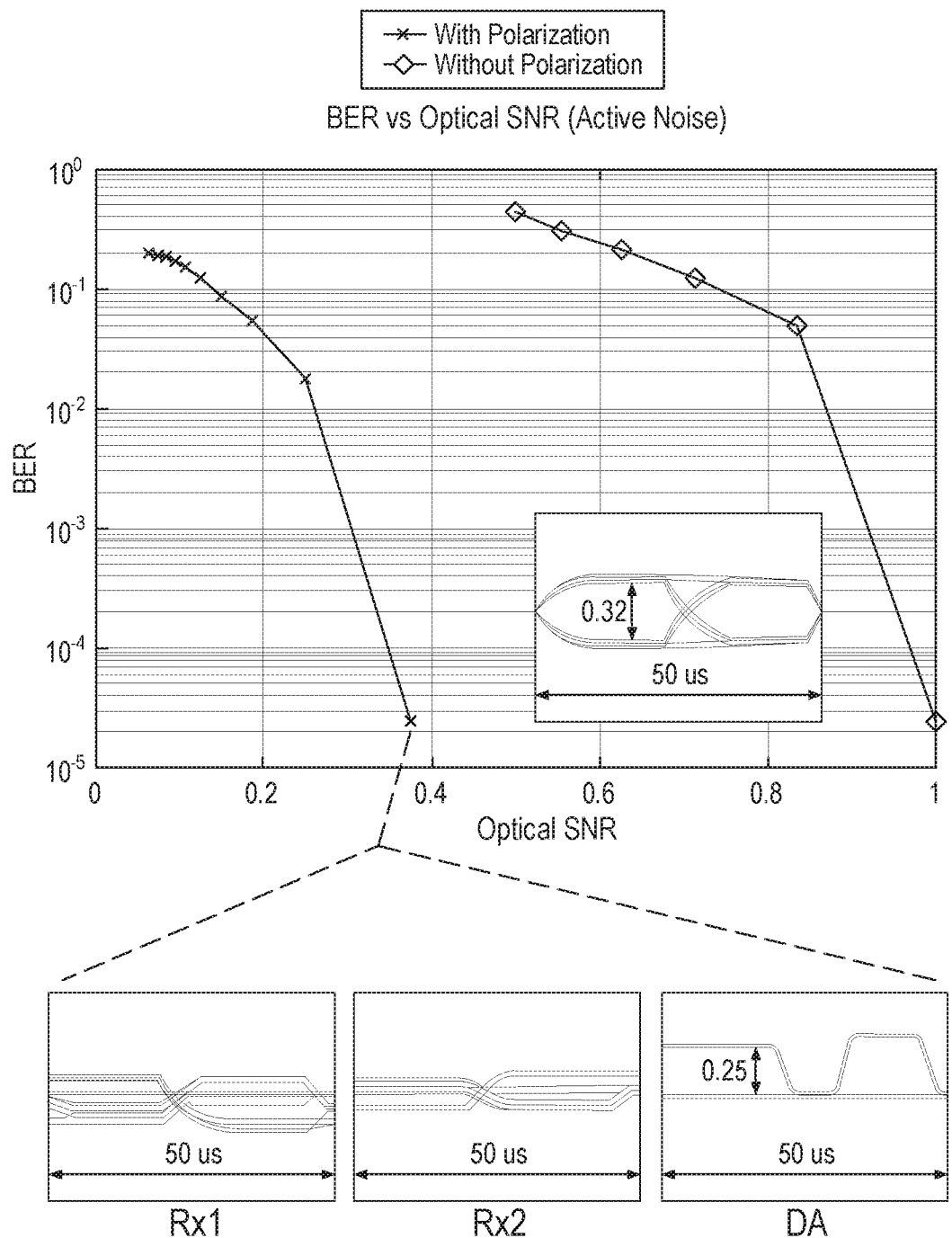
FIG. 15 BER and eye diagrams under active noise.

FIG. 15 illustrates example results including BER and eye diagrams of received signal at different locations. Inset of FIG. 15 shows eye diagram for 1 symbol of conventional Manchester encoded VLC transceiver operating in the absence of optical noise except for ambient light. One data bit is represented by a 50 us wide pulse with a transition of 1 to 0 or 0 to 1 in order to represent data bit 0 or 1 respectively. Conventional Manchester encoded transceiver achieves low BER without any external noise source except for ambient light as shown by wide eye opening. However in the presence of active optical noise operating in similar frequency band as that of data, system performance degrades and BER increases abruptly. Same phenomenon is observed in proposed transceiver architecture at the output of Rx1 or Rx2 individually, as shown by very little eye opening in eye diagrams of Rx1 and Rx2 plotted below the BER curve of FIG. 15 at optical SNR of 0.37. However, this optical noise is negated by DA employing common-mode noise rejection.

The output of DA is a noise rejected signal with wider eye opening as shown in eye diagram of DA below BER curve of FIG. 15. This results in successful decoding of data achieving low BER even at very low optical SNR.

This disclosure relates to a differential amplification based methodology for establishing a noise tolerant VLC link utilizing circular polarization was proposed and implemented conforming to PHY 1 category of IEEE standard 802.15.7. The implemented system is robust to both active and passive noise and achieves the BER of less than 10-4 under intense optical noise reaching 420 lx of illuminance. The proposed architecture can tolerate 22.3% less SNR under passive noise and 32.6% less SNR under active noise environment when compared with conventional VLC transceiver to maintain BER of 10-3. The proposed architecture is independent of operating frequency of data and optical noise and achieves low BER with complete spectral overlap of optical noise with data. The system was also able to successfully decode the data under total saturation/blockage of partial receiver. One of the promising application of proposed transceiver architecture is in Intelligent Transportation System (ITS) by utilizing it to form a robust V2V optical link in outdoor noisy channel environment where multiple transmitters would operate in similar frequency bands.

It is apparent that various modifications and variations can be made to the disclosed embodiments. It is intended that the specifications be considered as exemplary only, with a true scope of the disclosure being indicated by the following claims and their equivalents.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A visible light communication system configured to be resistant to dynamic optical noise interference, the system comprising:
    an input for communication data to be transmitted;
    a transmitting terminal comprising:
    a complementary data generator to generate in-phase optical signals and complementary out-of-phase optical signals based upon the communication data to be transmitted;
    a first transmitting module to transmit the in-phase optical signals comprising a plurality of first visible light sources for generating a plurality of first optical signals and a first transmitting polarization lens for polarizing the first optical signals to generate a plurality of first polarized optical signals; and
    a second transmitting module to transmit the complementary out-of-phase optical signals comprising a plurality of second visible light sources for generating a plurality of second optical signals and a second transmitting polarization lens for polarizing the second optical signals to generate plurality of second polarized optical signals, the first transmitting module and the second transmitting module operating together in a complementary way based upon the incoming communication data;
    wherein a polarization of the first transmitting polarization lens is orthogonal to a polarization of the second transmitting polarization lens, and the first polarized optical signals are orthogonally polarized to the second polarized optical signals;
    a receiving terminal comprising:
    a first receiving module comprising of a photodiode for receiving the plurality of first polarized optical signals and a first receiving polarization lens to pass the plurality of first polarized optical signals;
    a second receiving module comprising of a photodiode for receiving the plurality of second polarized optical signals and a second receiving polarization lens to pass the plurality of second polarized optical signals,
    wherein a polarization of the first receiving polarization lens and the polarization of the first transmitting polarization lens are the same, and a polarization of the second receiving polarization lens and the polarization of second transmitting polarization lens are the same;
    a differential amplification module comprising of a differential amplifier that amplifies the difference of out-of-phase data received from both the first receiving module and from the second receiving module and discards any common optical noise sensed by both the first receiving module and the second receiving module, thereby improving SNR; and
    a comparator which receives an output signal from the differential amplifier and converts the output signal into digital demodulated data based on a threshold level of the comparator, wherein the receiving terminal is able to accomplish error free decoding by adjusting the threshold level of the comparator.

2. The visible light communication system according to claim 1, wherein the visible light sources are at least one of light emitting diodes and laser diodes.

3. The visible light communication system according to claim 1, wherein the photodiodes can be in plurality and include at least one of P-intrinsic-N (PIN) photodiodes, avalanche photodiodes (APD), and charge-coupled devices (CCD).

4. A visible light communication system configured to be resistant to dynamic optical noise interference, the system comprising:
    an input for communication data to be transmitted;
    a transmitting terminal comprising:
    a complementary data generator to generate in-phase optical signals and complementary out-of-phase optical signals based upon the communication data to be transmitted;
    a first transmitting module to transmit the in-phase optical signals comprising a plurality of first visible light sources for generating a plurality of first optical signals and a first transmitting polarization lens for polarizing the first optical signals to generate a plurality of first polarized optical signals; and
    a second transmitting module to transmit the complementary out-of-phase optical signals comprising a plurality of second visible light sources for generating a plurality of second optical signals and a second transmitting polarization lens for polarizing the second optical signals to generate plurality of second polarized optical signals, the first transmitting module and the second transmitting module operating together in a complementary way based upon the incoming communication data;
wherein a polarization of the first transmitting polarization lens is orthogonal to a polarization of the second transmitting polarization lens, and the first polarized optical signals are orthogonally polarized to the second polarized optical signals;
a receiving terminal comprising:
   a first receiving module comprising of a photodiode for receiving the plurality of first polarized optical signals and a first receiving polarization lens to pass the plurality of first polarized optical signals;
   a second receiving module comprising of a photodiode for receiving the plurality of second polarized optical signals and a second receiving polarization lens to pass the plurality of second polarized optical signals,
   wherein a polarization of the first receiving polarization lens and the polarization of the first transmitting polarization lens are the same, and a polarization of the second receiving polarization lens and the polarization of second transmitting polarization lens are the same;
a differential amplification module comprising of a differential amplifier that amplifies the difference of out-of-phase data received from both the first receiving module and from the second receiving module and discards any common optical noise sensed by both the first receiving module and the second receiving module, the differential amplifier discarding the optical noise sensed by one of the first receiving module and the second receiving module in the event that the other of the first receiving module and the second receiving module is partially saturated, fully saturated or blocked by the optical noise; and
a comparator which receives an output signal from the differential amplifier and converts the output signal into digital demodulated data based on a threshold level of the comparator.

5. The visible light communication system according to claim 4, wherein the visible light sources are at least one of light emitting diodes and laser diodes.

6. The visible light communication system according to claim 4, wherein the photodiodes can be in plurality and include at least one of P-intrinsic-N (PIN) photodiodes, avalanche photodiodes (APD), and charge-coupled devices (CCD).

7. The visible light communication system according to claim 4, wherein the receiving terminal is able to accomplish error free decoding by adjusting the threshold level of the comparator.

\* \* \* \* \*